(12) United States Patent
Nakamizo et al.

(10) Patent No.: US 6,662,791 B2
(45) Date of Patent: Dec. 16, 2003

(54) FOUR-CYCLE OVERHEAD VALVE ENGINE

(75) Inventors: Keiichi Nakamizo, Hyogo (JP); Shinya Akase, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/360,425

(22) Filed: Feb. 7, 2003

(65) Prior Publication Data

US 2003/0150438 A1 Aug. 14, 2003

(30) Foreign Application Priority Data

Feb. 8, 2002 (JP) ...................................... 2002-031994

(51) Int. Cl.[7] .............................................. F01M 13/00
(52) U.S. Cl. ..................................................... 123/572
(58) Field of Search ................................. 123/572, 573, 123/574, 41.86

(56) References Cited

U.S. PATENT DOCUMENTS 4,601,267 A * 7/1986 Kronich ...................... 123/572
4,662,322 A * 5/1987 Tamba et al. ............. 123/41.86
5,058,542 A * 10/1991 Grayson et al. .......... 123/41.86
5,957,118 A * 9/1999 Tateno et al. ................ 123/573

* cited by examiner

*Primary Examiner*—Marguerite McMahon

(57) ABSTRACT

To provide a four-cycle overhead valve engine wherein the breather passage is defined to avoid an undesirable increase in size of the engine as a whole and also to avoid increase in length of the breather passage, a four-cycle overhead valve engine is provided which includes a cylinder block (6), and push rods (16 and 17) for driving intake and exhaust valves (14 and 15), respectively, that are mounted above the cylinder block (6). A breather passage (28) connecting a crank chamber (27) and a rocker arm chamber (31) with each other is made up of a first passage portion (28A) defined in the wall of the cylinder block (6) at a location adjacent a flywheel (9) and the push rods (16 and 17), and a second passage portion (28B) extending from one side adjacent the push rods (16 and 17) in a direction away from the push rods (16 and 17). A check valve (34) for the breather passage (28) is disposed at a junction between the first and second passage portions (28A and 28B).

20 Claims, 4 Drawing Sheets

FOUR-CYCLE OVERHEAD VALVE ENGINE

BACKGROUND OF THE INVENTION

1. Field of the Invention

The present invention relates to a four-cycle overhead valve engine including intake and exhaust valves mounted atop a cylinder block and push rods arranged in a lateral portion of the cylinder block for driving the intake and exhaust valves.

2. Description of the Prior Art

In the four-cycle overhead valve engine now in use, push rods for driving respective intake and exhaust valves mounted above an engine cylinder block are disposed in a portion of the wall of the engine cylinder block laterally of a cylinder bore in which a piston reciprocates and a breather passage for communicating a crank chamber and a rocker arm chamber together is disposed in another portion of the wall of the engine cylinder block laterally of the cylinder bore remote from the push rods, for example, spaced 180° from the push rods with respect to a cylinder axis of the cylinder bore.

In this type of the known four-cycle overhead valve engine, the engine cylinder block tends to be bulky in size, having a lateral wall protrusion for accommodating the breather passage at such another portion of the cylinder wall opposite to the portion where the push rods are accommodated.

Apart from the engine discussed above, another four-cycle overhead valve engine is known, in which the breather passage is defined at a location adjacent a flywheel in a portion of the wall opposite to the portion of the wall of the engine cylinder block where the push rods are accommodated.

In this second mentioned four-cycle overhead valve engine, since the breather passage is separated a distance from a push rod chamber in which the push rods are operatively accommodated, an oil return passage through which an oil accumulated within the breather passage is returned to the push rod chamber is required to have an increased length, resulting in complexity in structure.

SUMMARY OF THE INVENTION

In view of the foregoing, the present invention is intended to provide a four-cycle overhead valve engine wherein a breather passage is defined in a manner to avoid an undesirable an increase in size of the engine as a whole and also to avoid an increase in length of the breather passage.

In order to accomplish the foregoing object of the present invention, a four-cycle overhead valve engine according to the present invention includes a cylinder block, and push rods for driving intake and exhaust valves, respectively, that are mounted above the cylinder block. The push rods are operatively arranged in a side wall of the cylinder block, and a breather passage connecting a crank chamber and a rocker arm chamber with each other is made up of a first passage portion defined in the wall of the cylinder block at a location adjacent a flywheel and the push rods, and a second passage portion extending from one side adjacent the push rods in a direction away from the push rods. A check valve for the breather passage is disposed at a junction between the first and second passage portions.

According to the present invention, a lateral wall protrusion of the cylinder block at a location opposite to the push rods can be minimized, the cylinder block can be correspondingly reduced in size to thereby suppress increase of the size of the engine as a whole. Also, since the check valve is disposed in the vicinity of a push rod chamber accommodating the push rods, an oil return passage can have a substantially reduced length, where the oil return passage is employed to return an oil, tending to accumulate in a portion of the breather passage downstream of the check valve, to the push rod chamber. The second passage portion referred to above may be defined beneath, for example, an undersurface of a cylinder head mounted atop the cylinder block.

In one preferred embodiment, the cylinder block has a cylinder bore having a longitudinal axis and is arranged with its longitudinal axis inclined relative to a vertical direction and also to a horizontal direction so as to be diagonally upwardly oriented and wherein a push rod chamber accommodating the push rods in the cylinder block is defined in an underside portion of the wall of the cylinder block, that is positioned diagonally downwardly of a cylinder bore so as to extend along the cylinder bore.

With such a structure, a blow-by gas can easily be circulated to an upper portion of a rocker arm chamber accommodating rocker arms for driving the intake and exhaust valves through the second passage portion of the breather passage. Accordingly, an oil separated from the blow-by gas can smoothly flow onto the rocker arm by the effect of gravity and can then be easily returned to a crank chamber through the rocker arm chamber and the push rod chamber.

The breather passage referred to above may preferably include a third passage portion connecting the second passage portion with the rocker arm chamber. This third passage portion is defined in a portion of the cylinder head on one side remote from the push rods.

In one preferred embodiment of the present invention, the four-cycle overhead valve engine may further include an oil return passage for connecting a portion of the breather passage downstream of the check valve with the push rod chamber.

The oil contained in the blow-by gas tends to accumulate in the portion of the breather passage downstream of the check valve when the check valve is closed. However, according to the present invention, the oil accumulating in the portion of the breather passage downstream of the check valve with respect to the direction of flow of the blow-by gas can be returned to the push rod chamber through the oil return passage and then back to the crank chamber. Also, since the first passage portion of the breather passage is defined in the vicinity of the push rod chamber in the cylinder block and, hence, the junction between the first and second passage portions is located in the vicinity of the push rod chamber, the oil return passage referred to above can have a reduced length. It is to be noted that the oil return passage may be defined in the undersurface of the cylinder head mounted atop the cylinder block.

In one preferred embodiment of the present invention, a gasket may be interposed between the cylinder block and the cylinder head, and the check valve is provided in the gasket. This check valve is preferably employed in the form of a reed valve.

Where the check valve is provided in the gasket sandwiched between the cylinder head and the cylinder block, no extra fixture which would otherwise be needed to install the check valve is necessary, resulting in simplification of the structure.

In one preferred embodiment of the present invention, a stopper is defined in the cylinder head for regulating an opening of the check valve.

Since the stopper for regulating the opening of the check valve is formed integrally with the cylinder head, no element functionally corresponding to the stopper is needed to be formed separately, resulting in simplification of the structure.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

With reference to the accompanying drawings, a preferred embodiment of the present invention will be described in detail. Specifically, FIGS. 1 and 2 show a four-cycle overhead valve engine embodying the present invention in a front sectional view and a fragmentary side view, respectively.

Figure 1:
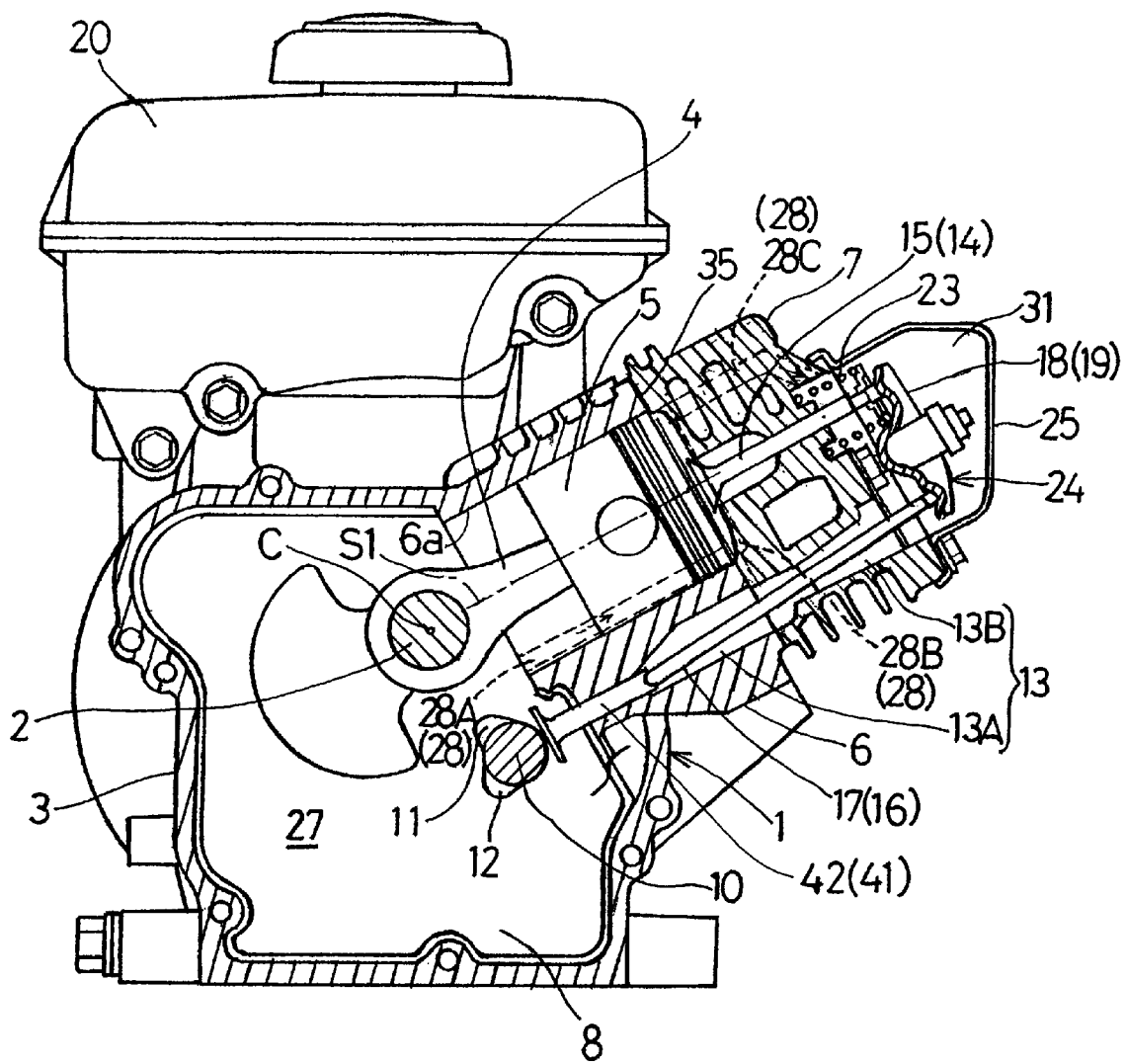
FIG. 1 is a front sectional view of a four-cycle overhead valve engine according to a first preferred embodiment of the present invention.
Figure 2:
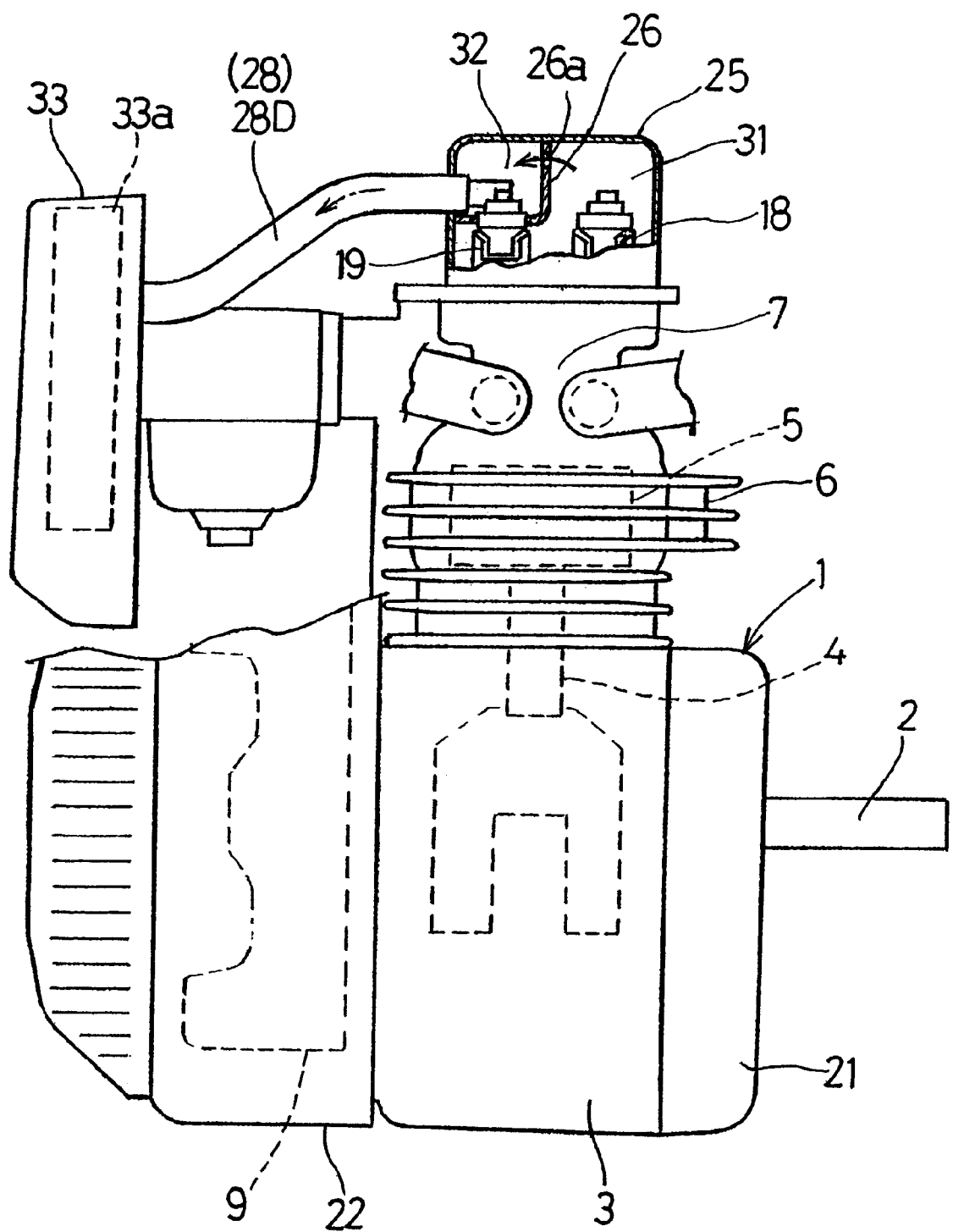
FIG. 2 is a side view of the four-cycle overhead valve engine embodying the present invention.

As shown in FIG. 1, the four-cycle overhead valve engine includes a engine body 1 provided with a crankcase 3 for rotatably supporting a horizontally lying crankshaft 2, a cylinder block 6 formed integrally with the crankcase 3, a piston 5 drivingly connected with the crankshaft 2 through a connecting rod 4 and accommodated within a cylinder bore 6a defined in the cylinder block 6 for sliding movement within the cylinder bore 6a, and a cylinder head 7 separate from the cylinder block 6 and mounted atop the cylinder block 6. The cylinder bore 6a of the cylinder block 6 has a longitudinal axis S1 and is disposed with its longitudinal axis S1 inclined relative to a horizontal direction and also to a vertical direction so that a top portion of the cylinder block 6 is diagonally upwardly oriented. The crankcase 3 has a bottom area defined as an oil sump 8. In FIG. 1, a power output end of the crank shaft 2 is on a forward side (front side) of the drawing sheet. In FIG. 2, the power output end of the crankshaft 2 is shown in a right-hand portion of the drawing and a flywheel is provided on opposite end portion of the power output end of the crankshaft, that is, a left-hand portion of the drawing of FIG. 2. The flywheel 9 concurrently serves as an engine cooling fan. The crankcase 3 has a front area opening outwardly to define a front opening which is in turn closed by a side cover 21. A fuel tank 20 shown in FIG. 1 is supported atop the crankcase 3.

A cam shaft 10 rotatably supported by the crankcase 3 so as to extend parallel to the crankshaft 2 has two cam members 11 and 12 mounted thereon in different phases for rotation together therewith and spaced a distance from each other in a direction lengthwise of the cam shaft 10 while being offset relative to each other in a direction circumferentially of the cam shaft 10. Rotation of the crankshaft 2 is transmitted to the cam shaft 10 through a gear train (not shown) and, accordingly this cam shaft 10 rotates in unison with the crankshaft 2. An underside portion of a side wall of the inclined cylinder block 6, that is positioned under the cylinder bore 6a, more particularly positioned diagonally downwardly of the cylinder bore 6a, has a lower chamber area 13A of a push rod chamber 13 defined therein so as to extend along the cylinder bore 6a while an upper chamber area 13B communicated with the lower chamber area 13a to define the push rod chamber 13 is defined in the cylinder head 7. A pair of push rods 16 and 17 for driving intake and exhaust valves 14 and 15, respectively, are movably accommodated within the push rod chamber 13. These push rods 16 and 17 have their lower ends adapted to engage the respective cam members 11 and 12 through associated tappets 41 and 42 and, accordingly, the push rods 16 and 17 can be driven up and down by the cam members 11 and 12 through the associated tappets 41 and 42 during rotation of the crankshaft 2.

Mounted atop the cylinder head 7 is a pair of rocker arms 18 and 19 that are engaged at one end thereof with upper ends of the push rods 16 and 17, respectively. Opposite ends of these rocker arms 18 and 19 remote from the associated push rods 16 and 17 are engaged respectively with the intake and exhaust valves 14 and 15 that are operatively supported by the cylinder head 7 through return springs 23. Thus, it will readily be seen that the push rods 16 and 17, the rocker arms 18 and 19, and the return springs 23 altogether form respective valve gears 24 for driving the intake and exhaust valves 14 and 15, respectively, in synchronism with rotation of the crankshaft 2 in a manner well known to those skilled in the art. A head cover 25 is mounted atop the cylinder head 7 to define between the head cover 15 and the cylinder head 7 a compartment that is divided by a partition wall 26, shown in FIG. 2, into a rocker arm chamber 31, within which the rocker arms 18 and 19 are enclosed, and a gas-liquid separation chamber 32. It is to be noted that the partition wall 26 has a small perforation 26a defined therein for communicating the rocker arm chamber 31 and the gas-liquid separation chamber 32 with each other.

A crank chamber 27 defined in a lower region of the crankcase 3 and the rocker arm chamber 31 above the cylinder head 7 are communicated with each other through a breather passage 28. This breather passage 28 defines a gas flow path through which a blow-by gas emerging from the crank chamber 27 when a pressure inside the crank chamber 27, which increases as a result of movement of the piston 5 under intake and expansion strokes, is relieved from the crank chamber 27 can be circulated to an intake air passage of the engine through the rocker arm chamber 31. The breather passage 28 is made up of a first passage portion 28A that is defined in a lower portion of the side wall of the inclined cylinder block 6 adjacent the push rods 16 and 17 and on one side thereof adjacent the flywheel 9 so as to extend from the crank chamber 27 to a top face of the cylinder block 6 along the longitudinal axis S1 of the cylinder bore 6a, a second passage portion 28B communicated with the first passage portion 18A and defined in the cylinder head 7 so as to extend in a direction away from the push rods 16 and 17, a third passage portion 28C communicated with the second passage portion 28B and defined in a side wall of the cylinder head 7 at a location remote from the push rods 16 and 17 (i.e., on one side of the longitudinal axis S1 opposite to the upper chamber area 13B of the push rod chamber 13) so as to extend towards and communicate with the rocker arm chamber 31, and a fourth passage portion 28D defined by a connecting tube as shown in FIG. 2 and extending from the gas-liquid separation chamber 32 to an outlet side of a cleaner element 33a in an air cleaner 33.

Figure 3:
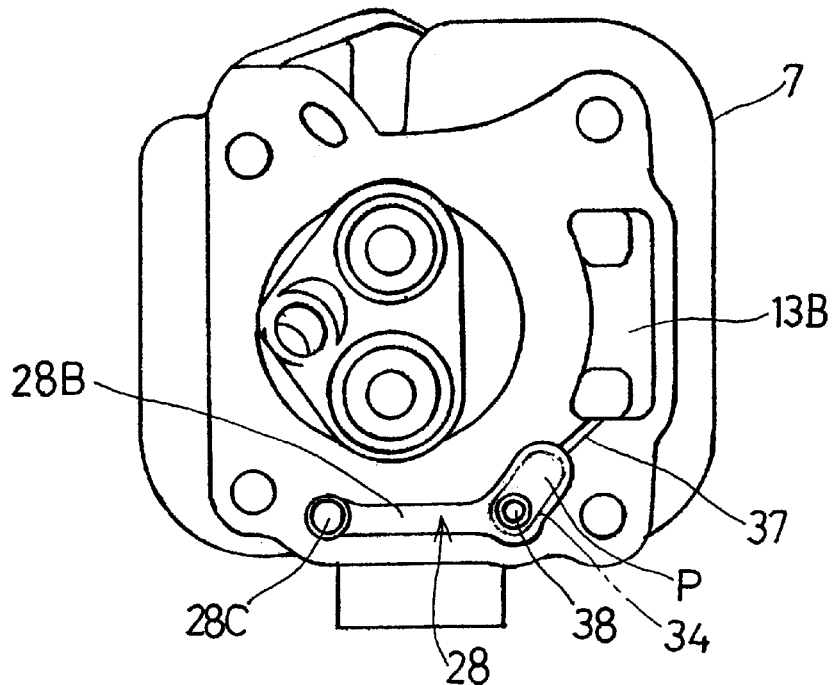
FIG. 3 is a bottom view of the four-cycle overhead valve engine shown in FIG. 1, showing a cylinder head thereof.
Figure 5:
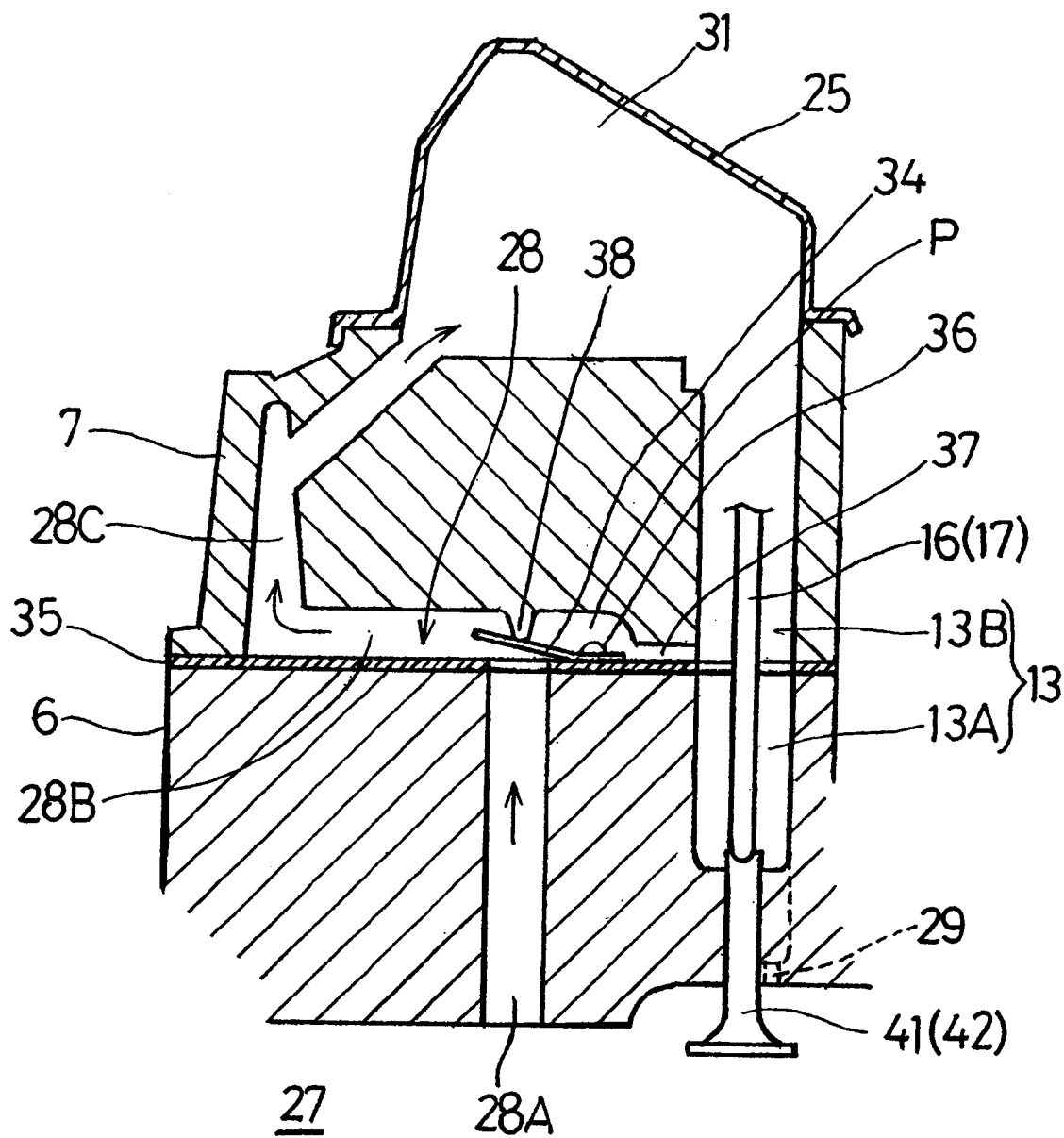
FIG. 5 is a cross-sectional view taken along the line V—V in FIG. 4.

Referring now to FIG. 3 showing a bottom plan view of the cylinder head 7, the second passage portion 28B of the breather passage 28 is defined in a bottom surface of the cylinder head 7. Also, as shown in FIG. 5, a check valve 34 for the breather passage 28 is positioned at a junction between the first and second passage portions 28A and 28B. This check valve 34 is operable to allow the flow of the blow-by gas in a first direction from the crank chamber 27 towards the rocker arm chamber 31, but prevents the flow in a second direction reverse to the first direction and is disposed in a head gasket 35 that is interposed between the cylinder block 6 and the cylinder head 7 for sealing therebetween.

Figure 4:
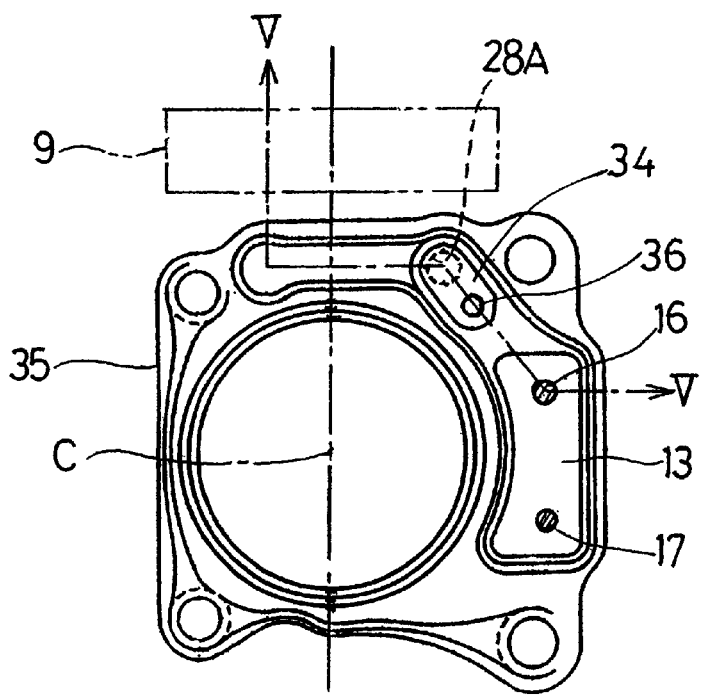
FIG. 4 is a plan view of a head gasket used in the four-cycle overhead valve engine.

In the illustrated embodiment, the head gasket 35 is prepared from a coated metal, a plane view of which is shown in FIG. 4. In this figure, to clearly show the relation in position between the head gasket 35 and a crank axis C represented by the longitudinal axis of the crankshaft, the crank axis C and the flywheel 9 are shown by respective phantom lines. The check valve 34 is in the form of a reed valve having one end riveted at 36 to the head gasket 35 and is hence supported by the head gasket 35. The reed valve forming the check valve 34 is made of a synthetic resin.

As shown in FIG. 5, a portion P of the breather passage 28 downstream of the check valve 34 at the junction between the first and second passage portions 28A and 28B with respect to the direction of flow of the blow-by gas, shown by the arrow-headed line, and the push rod chamber 13 are communicated with each other by means of an oil return passage 37. This oil return passage 37 is, as best shown in FIG. 3, formed in an undersurface of the cylinder head 7 at a location adjacent the portion P of the breather passage 28 downstream of the check valve 34. This undersurface of the cylinder head 7 is also formed with a stopper 38 for regulating the opening of the check valve 34 as shown in FIG. 5.

In the four-cycle overhead valve engine of the structure discussed above, when the internal pressure inside the crank chamber 27 which increases as a result of movement of the piston 5 under the intake and expansion strokes, is to be relieved from the crank chamber 27, the blow-by gas flows, as indicated by the arrow-headed lines, from the crank chamber 27 towards the rocker arm chamber 31 through the breather passage 28, particularly by way of the first, second and third passage portions 28A, 28B and 28C thereof and is then circulated from the rocker arm chamber 31 towards the inside of the air cleaner 33 through the gas-liquid separation chamber 32 and the fourth passage portion 28D of the breather passage 28. At this time, at the junction between the first and second passage portions 28A and 28B of the breather passage 28 as best shown in FIG. 5, since the internal pressure inside the crank chamber 27 has increased as described above, the check valve 34 is then opened to allow the blow-by gas to flow in the first direction from the crank chamber 27 towards the rocker arm chamber 31, thus establishing a circulation circuit. On the other hand, when the piston 5 is under the compression and exhaust strokes, a negative pressure prevails inside the crank chamber 27 and, therefore, the check valve 34 is closed to prevent the blow-by gas from flowing in the second direction opposite to the first direction.

It is to be noted that while the check valve 34 is closed, an oil component contained in the blow-by gas then flowing within the second and third passage portions 28B and 28C may flow backwards towards the check valve 34 and then accumulate at and in the vicinity of the portion P of the breather passage 28 downstream of the check valve 34. However, this oil component so accumulating can flow into the push rod chamber 13 by way of the oil return passage 37 and is then returned back to the crank chamber 27 from the lower chamber area 13A of the push rod chamber 13 by way of a return port 29 defined in the cylinder block 6 at a location laterally of the tappets 41 and 42. Also, when the blow-by gas flows from the rocker arm chamber 31 into the gas-liquid separation chamber 32 through the perforation 26a defined in the partition wall 26 within the compartment inside the head cover 25 shown in FIG. 2, the oil component mixed in the blow-by gas is separated and left within the rocker arm chamber 31 and, therefore, the blow-by gas substantially free of the oil component can be circulated to the inside of the air cleaner 33. The oil component left within the rocker arm chamber 31 shown in FIG. 5 is returned back to the crank chamber 27 through the push rod chamber 13 and then though the return port 29.

In the four-cycle overhead valve engine of the structure discussed above, the push rods 16 and 17 are disposed in the underside portion of the cylinder bore 6a of the cylinder block 6 and the first passage portion 28A of the breather passage 28 extends within the cylinder block 6 at a location on one side adjacent the flywheel 9 (FIG. 2) in the lateral portion of the push rods 16 and 17. Therefore, there is no breather passage in a portion of the wall of the cylinder block 6 on one side opposite to the push rods 16 and 17. Accordingly, a wall protrusion which would be required to form the breather passage in that portion (opposite portion of the push rods) of the wall of the cylinder block 6 can be substantially eliminated, thereby avoiding an increase of the size of the engine.

Also, since the cylinder block 6 is so disposed with its longitudinal axis S1 so as to incline relative to the horizontal direction and also to the vertical direction, and the breather passage is constituted such that the blow-by gas is led into an upper portion of the rocker arm chamber 31 having a gas-liquid separation chamber 32 through the breather passage, the oil component separated from the blow-by gas can be smoothly supplied by the gravity thereof towards the rocker arms 18 and 19 and can then be returned from the rocker arm chamber 31 towards the crank chamber 27 via the push rod chamber 13.

In addition, since the portion P of the second passage portion 28B of the breather passage 28 downstream of the check valve 34 provided at the junction between the first and second passage portions 28A and 28B shown in FIG. 5 is communicated with the oil return passage 37 defined in the undersurface of the cylinder head 7 and, in turn, with the push rod chamber 13 through such oil return passage 37, the oil component accumulating in the portion P downstream of the check valve 34 can be returned to the crank chamber 27 through the oil return passage 37 and then through the push rod chamber 13. Also, since the first passage portion 28A of the breather passage 28 is defined in the vicinity of the lower chamber area 13A of the push rod chamber 13 and the check valve 34 is also positioned in the vicinity of the lower chamber area 13A, the oil return passage 37 can have a relatively short length.

Yet, since the check valve 34 in the breather passage 28 is arranged in the head gasket 35 interposed between the cylinder block 6 and the cylinder head 7, no extra fixture is needed to install the check valve 34, resulting in simplification of the structure.

Considering that the cylinder head 7 is formed with the stopper 38 for regulating the opening of the check valve 34, no extra element capable of functioning as a stopper is needed and, accordingly, the structure can further be simplified.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A four-cycle overhead valve engine which comprises:
   a cylinder block;
   push rods for driving intake and exhaust valves, respectively, that are mounted above the cylinder block, said push rods being operatively arranged in a side wall of the cylinder block;
   a breather passage connecting a crank chamber and a rocker arm chamber with each other, said breather passage including a first passage portion defined in the wall of the cylinder block at a location adjacent a flywheel and the push rods, and a second passage portion extending from one side adjacent the push rods in a direction away from the push rods; and
   a check valve for the breather passage, said check valve being disposed at a junction between the first and second passage portions.

2. The four-cycle overhead valve engine as claimed in claim 1, wherein the cylinder block has a cylinder bore having a longitudinal axis and is arranged with its longitudinal axis inclined relative to a vertical direction and also to a horizontal direction so as to be diagonally upwardly oriented and wherein a push rod chamber accommodating the push rods in the cylinder block is defined in an underside portion of the wall of the cylinder block which portion is positioned diagonally downwardly of the cylinder bore so as to extend along the cylinder bore.

3. The four-cycle overhead valve engine as claimed in claim 1, further comprising a cylinder head mounted atop the cylinder block and wherein the second passage portion is defined in an undersurface of the cylinder head that is held in contact with the cylinder block.

4. The four-cycle overhead valve engine as claimed in claim 1, wherein the breather passage also includes a third passage portion connecting the second passage portion with the rocker arm chamber, said third passage portion being defined in a portion of the cylinder head on one side remote from the push rods.

5. The four-cycle overhead valve engine as claimed in claim 1, further comprising an oil return passage for connecting a portion of the breather passage downstream of the check valve with the push rod chamber.

6. The four-cycle overhead valve engine as claimed in claim 5, further comprising a cylinder head mounted atop the cylinder block and wherein the oil return passage is defined in an undersurface of the cylinder head that is held in contact with the cylinder block.

7. The four-cycle overhead valve engine as claimed in claim 1, further comprising a cylinder head mounted atop the cylinder block and a gasket interposed between the cylinder block and the cylinder head and wherein the check valve is provided in the gasket.

8. The four-cycle overhead valve engine as claimed in claim 7, wherein the check valve comprises a reed valve.

9. The four-cycle overhead valve engine as claimed in claim 8, further comprising a cylinder head mounted atop the cylinder block and a stopper defined in the cylinder head for regulating an opening of the check valve.

10. An internal combustion engine having a crank case connected to an engine a block, a cylinder head mounted on the engine block and a rocker cover connected to the cylinder head, comprising:
    a first passageway in the engine block for venting fluid flow from the crank case;
    a second passageway in the cylinder head fluidically connected with the first passageway; and
    a head gasket sealing the cylinder head to the engine block with a valve opening connecting the first passageway to the second passageway, a valve portion fixed to the head gasket on one side of the valve opening and cantilevered across the valve opening to movingly provide a check valve movement to pass fluid flow from the first passageway to the second passageway while blocking fluid flow from the second passageway to the first passageway.

11. The internal combustion engine of claim 10 wherein an oil return passageway is connected to the second passageway to return any oil adjacent to the valve portion to the crank case.

12. The internal combustion engine of claim 10 wherein the valve portion is integral with the head gasket.

13. The internal combustion engine of claim 10 where the first passageway is positioned approximately perpendicular to the second passageway.

14. The internal combustion engine of claim 13 wherein a surface of the head gasket forms a part of the second passageway, and a groove in the undersurface of the cylinder head forms the remainder of the second passageway.

15. The internal combustion engine of claim 14 wherein the cylinder block has a cylinder bore having a longitudinal axis and is arranged with its longitudinal axis inclined relative to a vertical direction and also to a horizontal direction so as to be diagonally upwardly oriented and wherein a push rod chamber for accommodating push rods in the cylinder block is defined in an underside portion of the wall of the cylinder block which portion is positioned diagonally downwardly of a cylinder bore so as to extend along the cylinder bore.

16. The internal combustion engine of claim 15 further including a third passageway in the cylinder head extending perpendicular to the second passageway and positioned on the other side of the cylinder block from the push rod chamber.

17. The internal combustion engine of claim 16 further including an oil return passage operatively aligned with and connecting the second passageway to the push rod chamber.

18. The head gasket of claim 14 wherein the valve portion includes an opening offset from the valve opening to lessen a resistance to movement of the valve portion relative to the valve opening.

19. The head gasket of claim 14 wherein the valve opening has a raised annular convex perimeter in the head gasket to seat the valve portion.

20. The head gasket of claim 14 wherein the head gasket has a raised portion beneath the valve portion offset from the valve opening to prevent sticking of the valve portion to the head gasket.

* * * * *